United States Patent

[11] 3,575,380

[72] Inventor Chester A. Siver
      10 Fair Hill Lane, Suffield, Conn. 06078
[21] Appl. No. 863,927
[22] Filed Oct. 6, 1969
[45] Patented Apr. 20, 1971

[54] GATE VALVE AND METHOD OF CONSTRUCTING SAME
5 Claims, 7 Drawing Figs.
[52] U.S. Cl. .................................................. 251/327, 251/329
[51] Int. Cl. .................................................. F16k 3/12
[50] Field of Search .......................................... 251/327, 329

[56] References Cited
UNITED STATES PATENTS
1,754,198  4/1930  Du Bois ........................ 251/327
2,224,231  12/1940  Mohr ........................... 251/327X
3,111,137  11/1963  Carlin .......................... 251/329X Primary Examiner—Arnold Rosenthal
Attorney—Peter L. Costas ABSTRACT: A gate valve employs a generally cylindrical sleeve on the body thereof encircling the chamber in which the gate member reciprocates to open and close the flow passage through the valve. The gate member is slidable between the open and closed positions thereof along a pair of guide rods which are secantally mounted in the sleeve and which extend within the chamber. In the method of assembly, two halves of the body are forced against a dummy gate member and the seals therebetween are tested for leakage, preferably both before and after bonding steps are effected.

Patented April 20, 1971
3,575,380
3 Sheets-Sheet 1
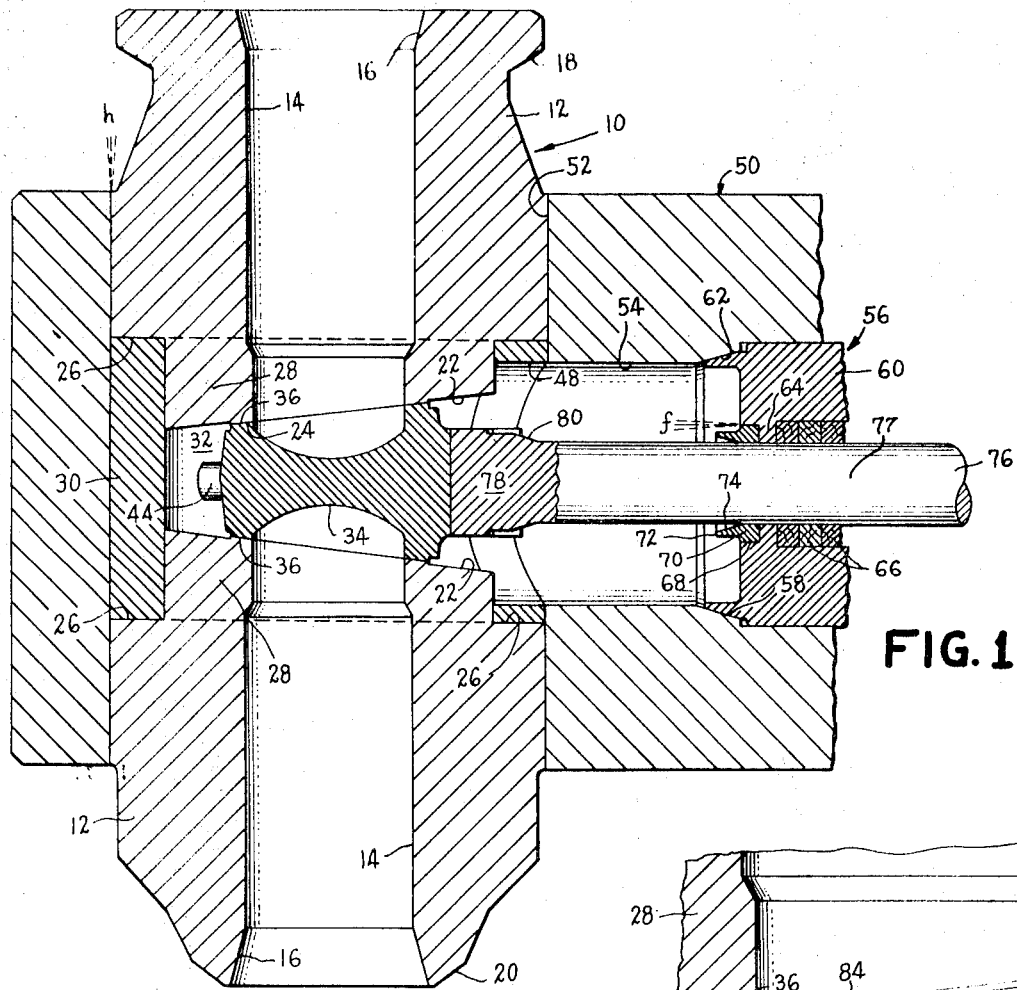
FIG. 1
FIG. 4
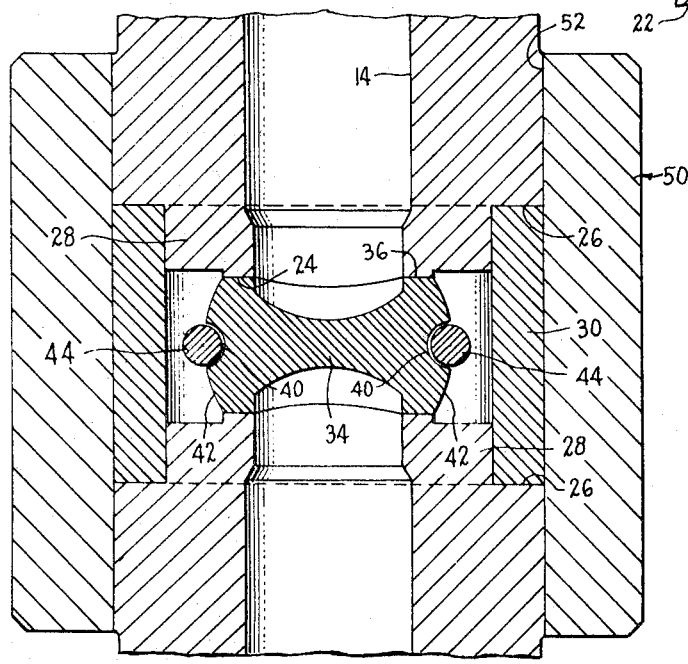
FIG. 2
INVENTOR
CHESTER A. SIVER
BY Peter L. Costas
ATTORNEY Patented April 20, 1971

INVENTOR
CHESTER A. SIVER
BY Peter L. Costas
ATTORNEY

INVENTOR
CHESTER A. SIVER

GATE VALVE AND METHOD OF CONSTRUCTING SAME

BACKGROUND OF THE INVENTION

Gate valves and the like are widely used because they offer a number of significant advantages including relative simplicity of design and operation and desirably low levels of resistance to fluid flow therethrough in the open position. The latter advantage is attributable to two basic features of such valves: namely, the passage therethrough is generally direct and need not be significantly smaller in cross section than are adjacent pipes or fittings and the ability to completely withdraw the disc or gate member from the path of fluid flow. However, the design of valves of this type is somewhat limited, largely because of the difficulty of providing hardened, wear-resistant surfaces and elements therein to furnish durable and accurately dimensioned and configured valve seats and to provide suitable means for guiding the disc between the open and closed positions of the valve under full line pressure. Conventional techniques for providing such wear-resistant elements are costly, relatively inaccurate or result in some loss of mechanical properties of the elements thereabout.

Accordingly, it is an object of the present invention to provide a valve that includes a novel structure providing means for guiding the travel of the disc or gate member therein.

It is also an object of the invention to provide such a valve including separately formed, hardened, wear-resistant, metallic elements providing sealing surface portions and/or guide means therein.

Another object is to provide a valve wherein alternate body members may be used to provide different configurations for joining adjacent fittings.

SUMMARY OF THE DISCLOSURE

It has now been found that the foregoing and related objects can be readily attained in a valve that includes a valve body having a chamber therein and inlet and outlet passages communicating with the chamber. A valve seat is provided on the chamber-defining wall of the body between the inner ends of the passages, and a gate member in the valve body is adapted for engagement with a valve actuating member for reciprocation between an open position and a closed position wherein it is seated in the valve seat to close the passage through said chamber between said inlet and outlet passages. The valve seat has sealing surface portions adjacent each of the inlet and outlet passages, and the gate member has sealing surfaces thereon cooperating with each of the valve sealing surface portions for sealing engagement thereagainst when the gate member is in the closed position. A generally cylindrical sleeve member that substantially encircles the chamber is provided on the valve body and has its axis extending generally perpendicular to the axis of reciprocation of the gate member. Secantally mounted in the sleeve member and extending through the chamber in parallel alignment with the axis of reciprocation of the gate member is at least a pair of guide rods, which are seated in at least a pair of cooperatively dimensioned and configured parallel channels provided in the gate member, so that the gate member is slidable therealong in reciprocation between the open and closed positions thereof. A radial aperture is provided in the sleeve for passage of the valve actuating member to permit the valve actuating member to engage with and reciprocate the gate member.

In the preferred embodiment of the invention, the inlet and outlet passages of the valve are coaxially aligned in the body on opposite sides of the chamber therein, and the corresponding sealing surfaces are on opposite sides of the gate member so that the gate member is seated directly between the passages when it is in its closed position. Such a gate member may have parallel edge surfaces between the opposite sides thereof with each of the edge surfaces having one of the channels therein. The sleeve member is desirably coaxial with the passages through the body and the guide rods are preferably spaced in the sleeve equidistantly from the center thereof.

Most desirably the wall of the body defining the chamber has opposed portions that diverge in the direction of the aperture in the sleeve to provide the chamber with a generally V-shaped cross-sectional configuration. Accordingly, the gate member is generally wedge-shaped with the sealing surfaces extending in planes diverging toward the base thereof and disposed in the same angular relationship as that which exists between the opposed portions of the wall of the body. It is especially desirable that the sealing surface portions of the valve seat be provided by separately formed, hardened, wear-resistant, metallic elements which are bonded to the wall of the body defining the chamber therein in a manner avoiding any deterioration of physical properties or distortion in dimension or configuration.

In accordance with the instant method of assembling a valve of the type hereinbefore described, a pair of body members is positioned with one end of each in close fitting engagement within the open ends of a generally cylindrical sleeve member and with a dummy member mounted therebetween. Each of the body members has a passage through it and a sealing surface portion on the inserted end portion thereof about the passage which bears upon a corresponding sealing surface of the dummy member in the operative relationship of the parts. The body members are then forced toward one another into a position wherein the sealing surface portions thereof sealingly engage with the corresponding sealing surfaces of the dummy member. The passages of the body member are sealed at points spaced from the inserted end portions thereof, and the sleeve is bonded to the body members to maintain the engaged position previously described. Thereafter, fluid under pressure is injected through the dummy member to test the tightness of the seals between the sealing surface portions of the body members and the corresponding sealing surfaces of the dummy member, after which the dummy member is removed through an aperture in the sidewall of the sleeve and a gate member is substituted therefor to provide a valve subassembly.

The method preferably includes preliminary steps wherein the body members are positioned in close fitting engagement with the dummy member therebetween, but in the absence of the sleeve member. The body members are forced toward one another to the position of engagement with the sealing surfaces of the dummy member, and the tightness of the seals is tested in the manner previously described. Thereafter, the body and dummy members are disassembled and then reassembled with the sleeve member as described.

Most desirably, the method includes the step of bonding a separately formed, hardened, wear-resistant, metallic element to the end portion of each of the body members to provide the sealing surface portions thereon. It is particularly desirable to include the additional steps of seating the valve subassembly within a principal housing therefor, engaging with the gate member a valve actuating member provided in the principal housing, and bonding the subassembly and housing together to provide a valve assembly. Most preferably, at least one of the bonding steps employed in the method is effected by an electron beam welding technique.

BRIEF DESCRIPTION OF THE DRAWINGS

FIG. 1 is a fragmentary sectional view of a gate valve embodying the present invention and with the gate member in the closed position;

FIG. 2 is a fragmentary sectional view of the valve of FIG. 1 along a plane perpendicular to the axis of reciprocation of the gate member;

FIG. 4 is an enlarged fragmentary sectional view of the body and gate members showing the cooperating sealing surfaces thereof;

DETAILED DESCRIPTION OF THE ILLUSTRATED EMBODIMENT

Figure 3:
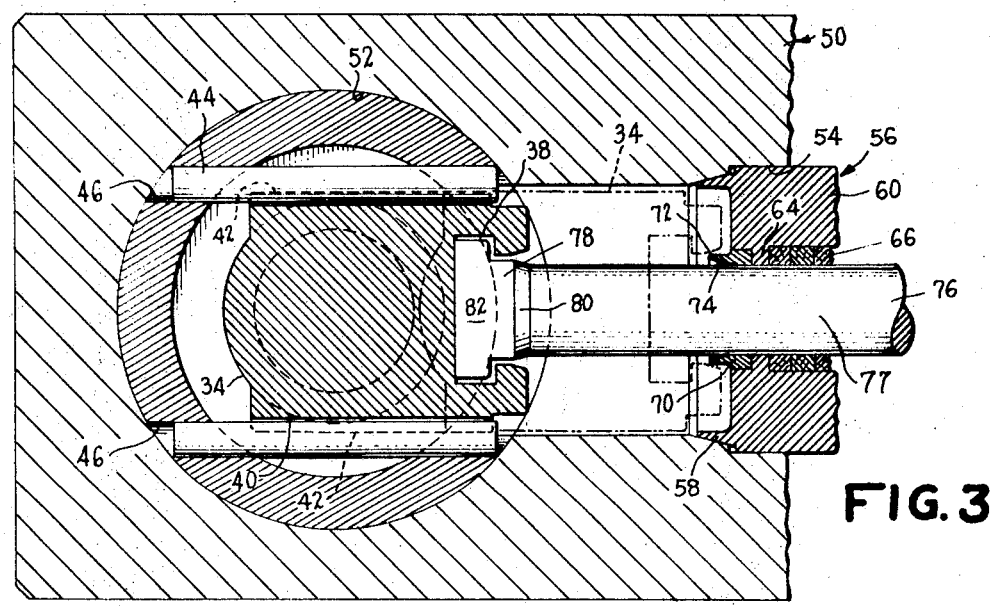
FIG. 3 is a fragmentary sectional view of the valve of FIG. 1 along a plane parallel to the axis of reciprocation but rotated 90° from that of the section in FIG. 1, the closed position of the gate member being shown in full line and the open position being shown in phantom line.
Figure 6:
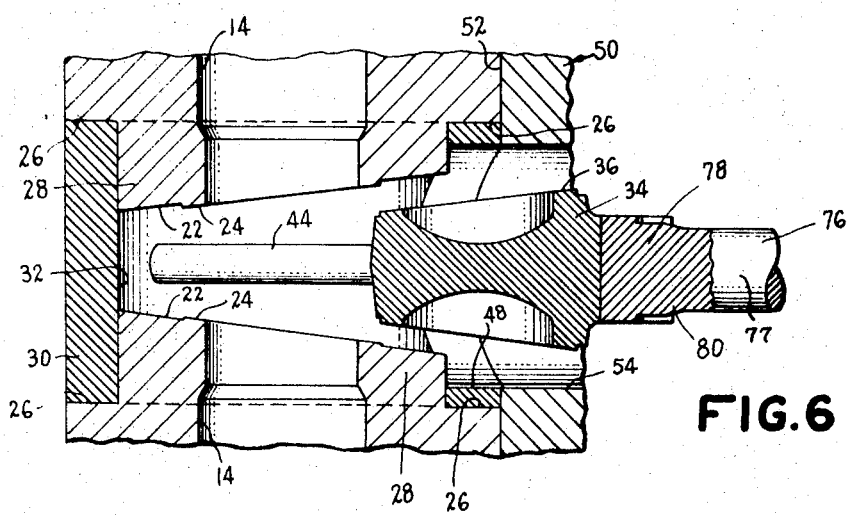
FIG. 6 is a fragmentary sectional view similar to FIG. 1 but with the gate member in open position.
Figure 5:
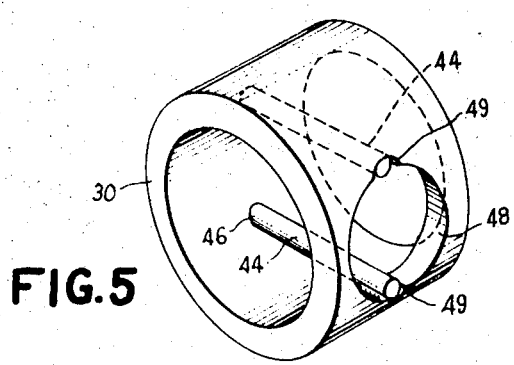
FIG. 5 is a perspective view of the sleeve and guide rod subassembly of the valve of FIGS. 1—4.

Turning now in detail to FIGS. 1—6 of the appended drawings, therein illustrated is a valve embodying the present invention including a valve subassembly generally designated by the numeral 10. The subassembly 10 includes a pair of similarly configured body members 12, each of which has extending therethrough an axial passage 14 with a flared outer end portion 16. The outer ends of the body members 12 are configured to permit joining of pipe sections, fittings, and the like thereto, two different configurations being shown to exemplify various possibilities. Thus, a circumferential collar 18 is provided on one of the body members 12 to permit clamping engagement therewith, and a beveled surface 20 which is appropriate for welding is provided on the end of the other body member 12.

The inner end wall 22 of each body member 12 is beveled and has a pair of generally annular sealing surface portions 24 thereon. Spaced from the inner ends of the body members 12 are annular shoulders 26 which define the inner end portions 28; the end portions 28 are seated within opposite ends of a cylindrical sleeve 30 with the passages 14 in axial alignment and with the end walls 22 forming a generally V-shaped chamber 32 in cooperation with an intermediate portion of the sleeve 30.

The valve subassembly 10 also includes a generally wedge-shaped gate member or "disc" which has, on the opposite faces thereof, annular sealing surfaces 36 which mate closely with the sealing surface portions 24 on the end walls 22 when the gate member 34 is in the closed position depicted in FIGS. 1—4 and seated in the valve seat provided by the sealing surface portions 24. As best seen in FIG. 3, the gate member 34 has a T-shaped slot 38 in its base or wide end for a purpose to be described more fully hereinafter.

As best seen in FIG. 2, the gate member 34 has a semicircular channel 40 along each of its parallel edge surfaces 42, and the sleeve 30 has secured thereacross a pair of parallel, secantally mounted cylindrical guide rods 44 (best seen in FIGS. 3 and 5) which are most desirably made of a hard, wear-resistant alloy. The guide rods 44 are seated in the channels 40 of the gate member 34, which slides therealong between the closed position of the valve illustrated in FIGS. 1—4 and the open position thereof shown in FIG. 6 and suggested by the phantom line representation of FIG. 3. The guide rods 44 are seated at one end in circular apertures 46 spaced to opposite sides of the centerline of the sleeve 30 and at the other end in arcuate grooves 49 of about 200° formed to opposite sides of the large radial aperture 48 in the sleeve 30. The large radial aperture 48 is dimensioned and configured to permit the gate member 34 to pass therethrough, both for assembly within the valve body and during reciprocation in the course of operation of the valve. The guide rods 44 are secured in assembly within the apertures 46 and grooves 49 by any suitable means, and the arcuate extent of the grooves 49 provides retaining surface about a major portion of the circumference of the rods 44.

The subassembly 10, consisting of the body members 12, the sleeve 30, the gate member 34 and the guide rods 44 may be preassembled (in a manner to be described hereinafter) and then assembled within a main housing generally designated by the numeral 50 which has a principal passage 52 of circular cross section extending therethrough in which the subassembly 10 is seated and a secondary passage 54 of circular cross section extending perpendicular thereto. The inner end of the secondary passage 54 is of the same diameter as that of the relatively large aperture 48 in the wall of the cylindrical sleeve 30 and is axially aligned therewith. The housing 50 includes a bonnet assembly, generally designated by the numeral 56 which is of circular cross section and is retained in an enlarged portion of the passage 54 spaced outwardly from the subassembly 10. The bonnet assembly 56 includes an annular bonnet member 60 with a bonnet seal lip 58 adjacent its outer circumference and which lip has a circumferential surface tapering axially inwardly of the passage 54 and seating upon the cooperatively tapered conical surface 62 between the smaller and larger diameter portions of the passage 54. The bonnet member 60 has a radially inwardly projecting retaining ring element 64 spaced along the length of its central passage and behind which is retained packing material such as packing rings 66. The spacing of the ring element 64 outwardly from the inner end of the bonnet member 60 provides a recess 68 at the inner end of the bonnet member 60 in which is seated and bonded an annular back seat collar 70. Bonding is desirably by an electron beam weld as indicated by the diagrammatic beam f in FIG. 1. The back seat collar has a back seat seal lip 72 projecting axially inwardly from the bonnet member 60, and the lip 72 has its inner surface 74 tapering outwardly form the bonnet member 60.

The valve stem 76 has a body portion 77 of circular cross section which is slidably received within the packing rings 66 and ring element 64, and guided by the collar 70 (preferably of a hard alloy) for reciprocation during operation of the valve. At its inner end, the valve stem 76 has an enlarged head portion 78 with a T-shaped segment 82 which is seated within the T-slot 38 of the gate member 34. The enlarged head portion 78 has a sealing surface 80 which tapers inwardly toward the body portion 77 of the stem 76 so as to provide a seal with the surface 74 of the back seat lip 72 when the valve stem 76 is reciprocated to open position.

Other elements of the bonnet assembly and valve are not shown since they may assume any conventional form. It will be appreciated that the valve stem 76 is moved axially by suitable means (not shown) to effect reciprocation thereof and thereby movement of the gate member 34 to open and closed positions.

As indicated in FIG. 4, the seating surface portion 24 on the wall 22 of the body members 12 and the corresponding sealing surfaces 36 on the gate member 34 may be provided by separately formed elements 84 of a hard, wear-resistant, metallic alloy, which are bonded to the respective members by suitable means, preferably by an electron beam weld to avoid distortion or loss of mechanical properties. Alternatively, the gate member 34 may be fabricated in its entirety from a hard, wear-resistant, metallic alloy, and preferred alloys are of the type sold by the Haynes-Stellite Division of Union Carbide Corporation under the trademark STELLITE.

Figure 7:
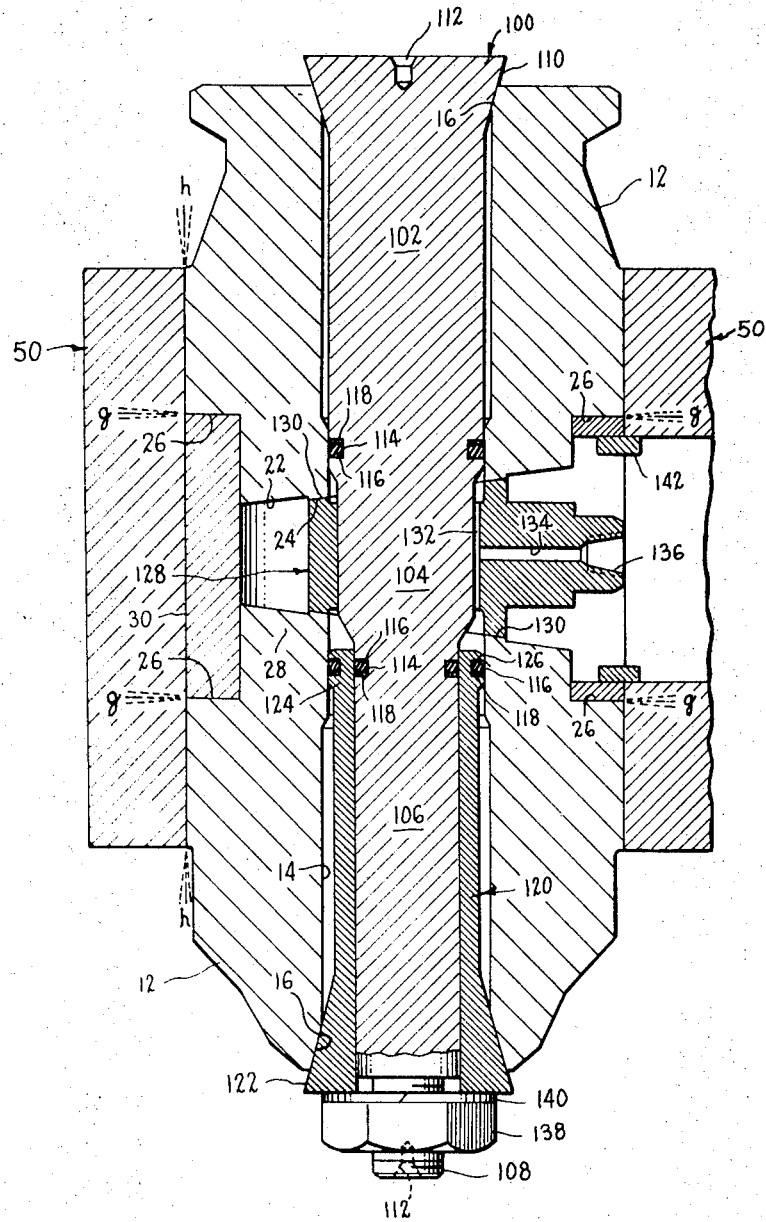
FIG. 7 is a sectional view of a valve body subassembly with a fixture for assembly and for testing of the sealing surfaces, and also showing diagrammatically the electron beam welds which are preferably employed.

Turning now to FIG. 7, a preferred method of assembly is illustrated in detail, and utilizes a device that includes a generally cylindrical arbor, generally designated by the numeral 100, which has a relatively large diameter base portion 102, a smaller diameter intermediate portion 104, and an end portion 106 further reduced in diameter. A threaded boss 108 projects axially from the end portion 106, and an enlarged tapered portion 110 is provided on the outer end of the base portion 102. Coaxial centering holes 112 are formed in each end of the arbor 100 for a purpose that will be more fully explained hereinafter; circumferential grooves 114 are provided in both the base portion 102 and the end portion 106 of the arbor 100 and each groove 114 has seated therein an O-ring 116 and a backup ring 118.

The second main part of the assembly device is a generally cylindrical sleeve, generally designated by the numeral 120, with an enlarged, externally beveled portion 122 at the outer end and a circumferential bead or rib 124 at the inner end thereof; the bead 124 has a circumferential groove 126 with an O-ring 116 and a backup ring 118 seated therein. Since the inside of the sleeve 120 and the outside of the end portion 106 of the arbor 100 are of virtually the same diameter, they can be telescopically assembled with the O-ring 116 and the backup ring 118 providing a tight seal therebetween. A generally wedge-shaped dummy gate member, generally designated by the numeral 128, is employed with the device during assembly of the valve, and the dummy member 128 has sealing surfaces 130 which are dimensioned, configured and positioned thereon in precisely the same relationship as the sealing surfaces 36 on the gate member 34. The dummy member 128 has a passageway 132 extending between the sealing surfaces 130, and a bore 134 extends normally from the passageway 132 to the outer end thereof and is provided with an enlarged, threaded portion 136 adjacent the outer end of the dummy member 128.

In the method of assembly, the arbor 100 is inserted into one of the body members 12 with the tapered end portion 110 resting upon the flared outer end portion 16 thereof. Since the diameter of the base portion 102 of the arbor 100 is virtually the same as the inside diameter of the corresponding portion of the passage 14, a tight seal is provided by the O-ring 116 and the back up ring 118 seated in the circumferential groove 114. The dummy member 128 is then positioned with one of the sealing surfaces 130 thereof bearing against the sealing surface portion 24 on the inner end wall 22 of the body member 12, with the intermediate section 104 of the arbor 100 aligned in the passageway 132 of the dummy member 128. Thereafter, the other body member 12 is positioned over the arbor 100 with the sealing surface portion 22 thereof bearing against the sealing surface 130 on the opposite face of the dummy member 128 to form a preassembly of the valve subassembly 10. Then the sleeve 120 is inserted into the passage 14 of the second body member 12, with the small diameter portion 106 of the arbor 100 passing therethrough and with the beveled portion 122 of the sleeve 120 bearing against the flared outer end portion 16 of the body member 12. The diameter of the bead 124 on the inner end of the sleeve 120 is virtually the same as the corresponding portion of the passage 14 so that the O-ring 116 and the back up ring 118 set seated in the groove 124 provide a seal therebetween.

After the two body members 12 are properly aligned, which can be facilitated by providing appropriate scribe lines on the various parts, a nut 138 and a washer 140 are tightened onto the boss 108 to force the arbor 100 into the sleeve 120 and thereby force the two body members 12 tightly against the dummy member 128 to form a fluidtight seal (if the mating surfaces are true and the parts are properly aligned). At this point, the spacing between the shoulders 26 on the end portions 28 of the body members 12 can be checked about the entire periphery of the preassembly to ensure that the two body members 12 and end walls 22 are in a proper angular relationship with respect to one another. Thereafter, a source of fluid pressure is attached to the bore 134 in the dummy member 128 by threading a suitable adapter (not shown) into the enlarged portion 136 thereof, and the tightness of the seals between the surfaces 130,24 can be determined, since the passages 14 are sealed by the several sets of O-rings 116 and back up rings 118. Thereafter, the various parts are disassembled and reassembled with the sleeve 30 suitably positioned therebetween and with the end portions 28 of the body members 12 inserted thereinto. After the same alignment and tightening steps have been performed, the sleeve 30 is appropriately bonded to the body members 12 about the periphery thereof, such as by a peripheral electron beam weld along the line indicated diagrammatically by the letter *g*. Then the tightness of the seal can once again be checked with a reapplication of fluid pressure through the bore 134, to confirm the absence of distortion resulting from the welding operation, which distortion would tend to cause leakage between the dummy member 128 and the body member 12. The entire unit can then be mounted on a suitable lathe between centers 112, and the sleeve 30 turned to the desired size, if necessary. After the arbor 100, sleeve 120 and dummy member 128 are disassembled and withdrawn, the subassembly 10, so assembled, is positioned in the passage 52 of the housing 50 so that the aperture 48 is in proper alignment with the passage 54 in the housing 50, whereupon the body members 12 and the housing 50 are bonded together, preferably by electron beam welds diagrammatically designated by the letter *h*. Preferably, such welds are sufficiently deep to extend to the centerline of the housing 50, that is the centerline thereof perpendicular to the passage 52, but at any rate they should have sufficient penetration to secure the back up ring 142. The back up ring 142 is then machined away so that a continuous surface defining the apertures 48,54 is formed, and the gate member 34, and other remaining parts are assembled to provide the completed valve.

It will be appreciated that the configuration of the several parts may vary from that specifically illustrated in the attached drawings. The housing and the body members are particularly susceptible to variation, depending upon the application and may be so constructed as to permit facile welding or bonding of end elements of various kinds for a given installation, thus minimizing the amounts of inventory required to suit diverse needs. Although a circular cross section is preferred for the guide rods, square or other configurations may be employed, and it will be appreciated that in such a case the corresponding portions of the gate member will be modified appropriately. Moreover, although a wedge-shaped disc or gate member is preferable, it may have parallel sides, and furthermore it may be provided with resilient sealing surfaces rather than the nonresilient construction described. By the present invention, various elements which are exposed to wear may be fabricated from a hard, wear-resistant metallic alloy (e.g., the sealing surface element and the guide rods) and readily assembled and bonded. Such bonding is preferably effected by an electron beam technique since this permits fluidtight, substantially distortion-free welds which avoid substantial loss in physical properties of the elements so bonded.

Thus, it can be seen that the present invention provides a valve that includes a novel structure to provide means for guiding the travel of the gate member. The valve may also include separately formed hardened, wear-resistant, metallic elements providing sealing surface portions of the seat therein. The novel method by which the valve is assembled readily permits the inclusion of such guiding means and sealing surface portions therewithin and also permits testing of the body subassembly for leakage during the assembly and joinder of the parts of the valve.

I claim:

1. In a valve including a valve body having a chamber therein and inlet and outlet passages communicating with said chamber, a valve seat on the chamber-defining wall of said body between the inner ends of said passages, a gate member in said valve body adopted for engagement with a valve actuating member for reciprocation between an open position and a closed position wherein said gate member is seated in said valve seat, to close the passage through said chamber between said inlet and outlet passages, said seat having sealing surface portions adjacent each of said inlet and outlet passages and said gate member having sealing surfaces thereon cooperating with said sealing surface portions for sealing engagement thereagainst when said gate member is in said closed position, the combination therewith of a generally cylindrical sleeve member on said valve body substantially encircling said chamber and with its axis extending generally perpendicular to the axis of reciprocation of said gate member, and at least a pair of guide rods secantally mounted in said sleeve member and extending through said chamber in parallel alignment with said axis of reciprocation of said gate member, said gate member having therein at least a pair of parallel cooperatively dimensioned and configured channels seating said guide rods so that said gate member is slidable along said guide rods in reciprocation between said open and closed positions thereof, said sleeve member having a radial aperture for passage of the valve actuating member to engage with and reciprocate said gate member.

2. The valve of claim 1 wherein said inlet and outlet passages are coaxially aligned in said body on opposite sides of said chamber and wherein said sealing surfaces are on opposite sides of said gate member so that said gate member is seated directly between said passages in said closed position thereof.

3. The valve of claim 2 wherein said gate member has parallel edge surfaces between said opposite sides thereof with one of said channels being in each of said edge surfaces and wherein said sleeve member is coaxial with said passages through said body, said guide rods being spaced in said sleeve equidistantly from the center thereof.

4. The valve of claim 3 wherein said wall of said body defining said chamber has opposed portions that diverge in the direction of said aperture in said sleeve to provide said chamber with a generally V-shaped cross-sectional configuration, and wherein said gate member is generally wedge-shaped with said sealing faces thereof extending in convergent planes disposed in the same angular relationship as that which exists between said opposed body wall portions.

5. The valve in claim 1 wherein said sealing surface portions of said valve seat and said guide rods are provided by separately formed, hardened, wear-resistant metallic elements, said elements providing said sealing surface portions being bonded to said chamber-defining wall of said body.